(12) United States Patent
Jung et al.

(10) Patent No.: US 11,489,183 B2
(45) Date of Patent: Nov. 1, 2022

(54) FUEL CELL SYSTEM AND CONTROL METHOD THEREOF

(71) Applicants: HYUNDAI MOTOR COMPANY, Seoul (KR); KIA MOTORS CORPORATION, Seoul (KR)

(72) Inventors: Ju Hae Jung, Uiwang-si (KR); Hyun Bae Dong, Yongin-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 7 days.

(21) Appl. No.: 17/011,416

(22) Filed: Sep. 3, 2020

(65) Prior Publication Data

US 2021/0328244 A1 Oct. 21, 2021

(30) Foreign Application Priority Data

Apr. 20, 2020 (KR) .......................... 10-2020-0047752

(51) Int. Cl.
| | |
|---|---|
| *H01M 8/04992* | (2016.01) |
| *H01M 8/04119* | (2016.01) |
| *H01M 8/04082* | (2016.01) |
| *H01M 8/04746* | (2016.01) |
| *H01M 8/0432* | (2016.01) |
| *H01M 8/04828* | (2016.01) |
| *H01M 8/04029* | (2016.01) |
| *H01M 8/04701* | (2016.01) |

(52) U.S. Cl.
CPC ... *H01M 8/04992* (2013.01); *H01M 8/04029* (2013.01); *H01M 8/0432* (2013.01); *H01M 8/04126* (2013.01); *H01M 8/04201* (2013.01); *H01M 8/04701* (2013.01); *H01M 8/04753* (2013.01); *H01M 8/04835* (2013.01)

(58) Field of Classification Search
CPC ......... H01M 8/04992; H01M 8/04119; H01M 8/04126; H01M 8/04835; H01M 8/04201; H01M 8/04753; H01M 8/04253
See application file for complete search history.

(56) References Cited

U.S. PATENT DOCUMENTS

2005/0175875 A1* 8/2005 Nelson .............. H01M 8/04029
429/429
2006/0121322 A1* 6/2006 Haas ................. H01M 8/04303
429/429

FOREIGN PATENT DOCUMENTS

JP 2010-182469 A 8/2010

* cited by examiner

*Primary Examiner* — Christopher P Domone
(74) *Attorney, Agent, or Firm* — Morgan, Lewis & Bockius LLP

(57) ABSTRACT

A fuel cell system includes a fuel cell stack including fuel and air electrodes, a fuel gas supply module configured to supply hydrogen and oxygen, as fuel gases, to the fuel cell stack, a fuel gas supply line including channels through which the fuel gases are supplied to the fuel cell stack, a humidification module disposed in the fuel gas supply line and configured to supply moisture to the fuel gases, and a controller configured to control the fuel gas supply line such that the fuel gases bypass the humidification module and are directly supplied to the fuel cell stack when temperature of the fuel cell stack is determined low at an initial stage of operation of the fuel cell stack, and the fuel gases pass through the humidification module and are supplied to the fuel cell stack when the temperature reaches a normal temperature.

14 Claims, 2 Drawing Sheets

FUEL CELL SYSTEM AND CONTROL METHOD THEREOF

CROSS-REFERENCE TO RELATED APPLICATION

The present application claims the benefit of priority to Korean Patent Application No. 10-2020-0047752, filed on Apr. 20, 2020 in the Korean Intellectual Property Office, the disclosure of which is incorporated herein by reference in its entirety.

TECHNICAL FIELD

The present disclosure relates to a fuel cell system and a control method thereof, and more particularly to a fuel cell system that injects dry gasses into a fuel cell stack to operate the fuel cell stack in a low output mode at an initial stage of operation of the fuel cell stack in order to prevent freezing in the case in which temperature of the fuel cell stack is low and injects humidified gases into the fuel cell stack to operate the fuel cell stack in a normal output mode after the temperature of the fuel cell stack increases to a normal temperature and a control method thereof.

BACKGROUND

When used as fuel, hydrogen generates no environmentally harmful products except for a very small amount of nitrogen oxide, and is easily stored in various forms, such as high-pressure gas, liquid gas, or metal hydride. For these reasons, technology using hydrogen as an energy source has been developed in various fields.

A fuel cell is a device that supplies hydrogen as fuel and generates electricity through electrochemical reaction with oxygen in the atmosphere. Such a fuel cell has advantages in that there is no separate combustion process, whereby electric power production efficiency is high, in that greenhouse gas, such as carbon dioxide, is not discharged, whereby the fuel cell is environmentally friendly, and in that heat is generated simultaneously when electricity is generated, whereby thermal energy is obtained. A small-sized fuel cell is used as a power source for vehicles or a mobile power source, whereas a large-sized fuel cell is used as a distributed cell for building or a cell for generation of electricity.

When a fuel cell stack is operated in a high output mode at a sub-zero temperature, water in the fuel cell stack is frozen, whereby the fuel cell stack is damaged and thus performance of the fuel cell stack is deteriorated while the lifespan of the fuel cell stack is reduced. Even for a fuel cell for generation of electricity as well as in the case in which the fuel cell stack is used as a power source for vehicles, there is still a problem in that freezing occurs in a low temperature state in which water is frozen.

Conventionally, a method of providing a separate heat emission device to directly increase temperature of the fuel cell stack or temperature of a coolant such that the coolant exchanges heat with the fuel cell stack in order to prevent freezing of the fuel cell stack is used. In this method, however, it is necessary to install the heat emission device, and electric power is needed to operate the heat emission device. Consequently, the conventional method has problems in that system installation cost increases and in that efficiency of a fuel cell system is deteriorated in a low temperature state in which freezing occurs.

The information disclosed in the Background section above is to aid in the understanding of the background of the present disclosure, and should not be taken as acknowledgement that this information forms any part of prior art.

SUMMARY

The present disclosure has been made in view of the above problems, and it is an object of the present disclosure to provide a fuel cell system that injects dry gasses into a fuel cell stack to operate the fuel cell stack in a low output mode at an initial stage of operation of the fuel cell stack such that the temperature of the fuel cell stack increases in the case in which it is determined that temperature of the fuel cell stack is low and injects humidified gases into the fuel cell stack to operate the fuel cell stack in a normal output mode when the temperature of the fuel cell stack reaches a normal temperature, thereby preventing damage to the fuel cell stack, and a control method thereof.

In accordance with an aspect of the present disclosure, to accomplish the above and other objects, a fuel cell system may include a fuel cell stack including a fuel electrode and an air electrode, a fuel gas supply module configured to supply hydrogen and oxygen, as fuel gases, to the fuel cell stack, a fuel gas supply line including channels through which the fuel gases are supplied to the fuel cell stack, a humidification module provided in the fuel gas supply line, the humidification module being configured to supply moisture to the fuel gases in order to humidify the fuel gases, and a controller configured to control the fuel gas supply line such that the fuel gases bypass the humidification module and are then directly supplied to the fuel cell stack upon determining that the temperature of the fuel cell stack is low at an initial stage of operation of the fuel cell stack, and the fuel gases pass through the humidification module and are then supplied to the fuel cell stack when the temperature of the fuel cell stack reaches a normal temperature.

The controller may control the discharge amount of each fuel gas discharged from the fuel gas supply module, may perform control such that the discharge amount of each fuel gas is a rated operation amount or less upon determining that the temperature of the fuel cell stack is low, and may perform control such that the discharge amount of each fuel gas is the rated operation amount when the temperature of the fuel cell stack reaches a normal temperature.

The controller may perform control such that the operation of the humidification module is stopped upon determining that the temperature of the fuel cell stack is low and such that the humidification module is operated when the temperature of the fuel cell stack reaches a normal temperature.

The fuel cell system may further include a cooling module including a reservoir tank configured to circulate a first coolant to exchange heat with the fuel cell stack.

The cooling module may further include a coolant tank configured to circulate a second coolant and a heat exchanger arranged between the reservoir tank and the coolant tank to allow the first coolant and the second coolant to exchange heat with each other.

In addition, the controller may perform control such that the coolant tank is operated upon determining that temperature of the first coolant is a cooling temperature or higher.

The controller may determine that the temperature of the fuel cell stack is a normal temperature in the case in which voltage of the fuel cell stack is a reference value or higher.

The fuel cell system may further include a temperature sensor configured to measure the temperature of the fuel cell stack, wherein the controller may determine whether the temperature of the fuel cell stack is a low temperature or a normal temperature based on the value measured by the temperature sensor.

In addition, the fuel gas supply module may include a hydrogen supply system configured to supply hydrogen to the fuel cell stack and an air supply system configured to supply air including oxygen to the fuel cell stack, and the fuel gas supply line may include a hydrogen supply line connected to the hydrogen supply system and to the fuel cell stack, the hydrogen supply line being configured to supply hydrogen humidified while passing through the humidification module to the fuel electrode, an air supply line connected to the air supply system and to the fuel cell stack, the air supply line being configured to supply air humidified while passing through the humidification module to the air electrode, a first bypass line diverging from a point of the hydrogen supply line before the humidification module, the first bypass line being configured to bypass the humidification module and to supply hydrogen directly to the fuel electrode, and a second bypass line diverging from a point of the air supply line before the humidification module, the first bypass line being configured to bypass the humidification module and to supply air directly to the air electrode The fuel cell system may further include a control valve disposed in the fuel gas supply line, the control valve being configured to control the channels of the fuel gas supply line, wherein the controller may control the control valve in order to control the channels.

The control valve may include a first control valve located at a junction point between the hydrogen supply line and the first bypass line and a second control valve located at a junction point between the air supply line and the second bypass line, and the controller may control the first control valve and the second control valve such that hydrogen and oxygen selectively pass through the humidification module.

Upon determining that the temperature of the fuel cell stack is low, the controller may perform control such that the amount of each fuel gas supplied to the fuel cell stack is less than the amount of each fuel gas when the temperature of the fuel cell stack is determined to be a normal temperature.

In accordance with another aspect of the present disclosure, a control method of the fuel cell system may include measuring the temperature of the fuel cell stack and determining whether the temperature of the fuel cell stack is low, supplying humidified gases to the fuel cell stack such that the fuel cell stack is operated in a normal output mode upon determining that the temperature of the fuel cell stack is a normal temperature at an initial stage of operation of the fuel cell stack, and supplying dry gases such that the fuel cell stack is operated in a low output mode upon determining that the temperature of the fuel cell stack is low, and measuring the temperature of the fuel cell stack when the fuel cell stack is operated in the low output mode and supplying the humidified gases upon determining that the temperature of the fuel cell stack reaches the normal temperature such that the fuel cell stack is operated in the normal output mode.

When the fuel cell stack is operated in the low output mode, the controller may determine that the temperature of the fuel cell stack is a normal temperature and may perform control such that the fuel cell stack is operated in the normal output mode in the case in which voltage of the fuel cell stack is a reference value or higher.

In addition, when the fuel cell stack is operated in the low output mode, the controller may perform control such that the amount of each fuel gas supplied to the fuel cell stack is less than the amount of each fuel gas that is supplied when the fuel cell stack is operated in the normal output mode.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE PREFERRED EMBODIMENTS

Figure 1:
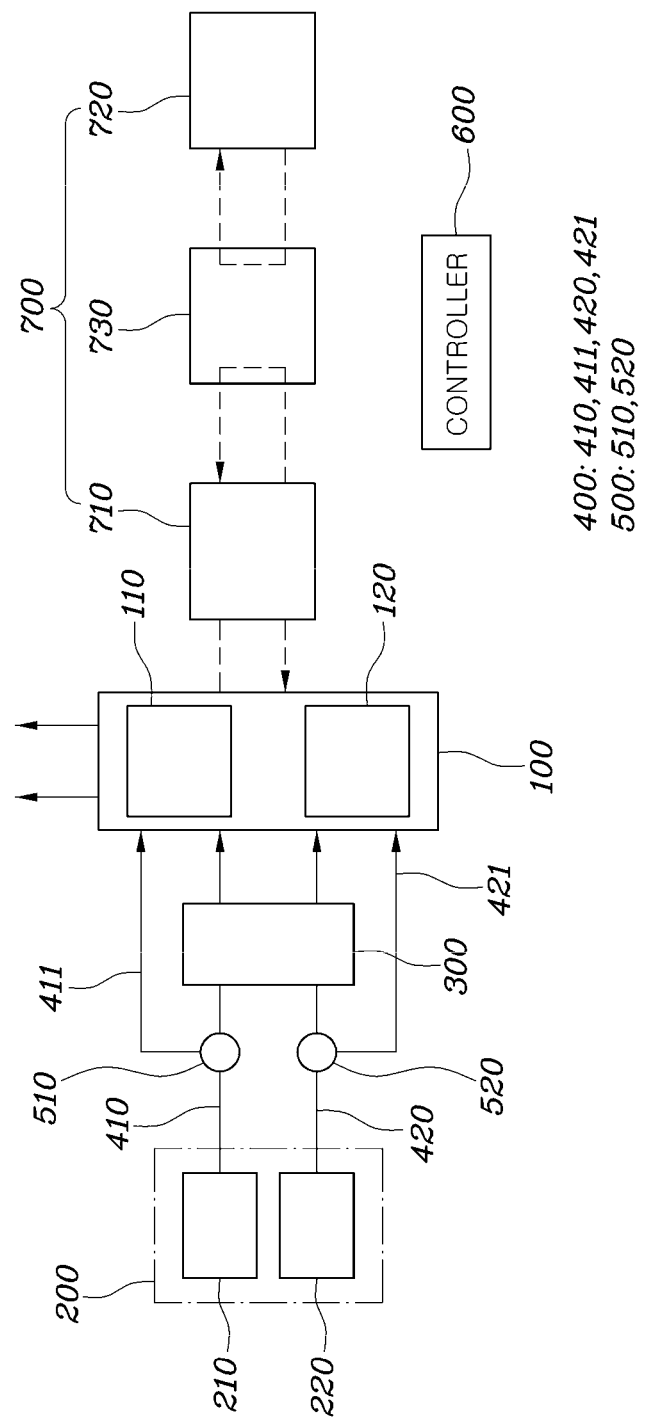
FIG. 1 is a view showing the construction of a fuel cell system according to an embodiment of the present disclosure.

Specific structural or functional descriptions of the embodiments of the present disclosure disclosed in this specification or this disclosure are given only to illustrate embodiments of the present disclosure. Embodiments of the present disclosure may be realized in various forms, and should not be interpreted as being limited to the embodiments of the present disclosure disclosed in this specification or this disclosure.

Since the embodiments of the present disclosure may be variously modified and may have various forms, specific embodiments will be shown in the drawings and will be described in detail in this specification or this disclosure. However, the embodiments according to the concept of the present disclosure are not limited to such specific embodiments, and it should be understood that the present disclosure includes all alterations, equivalents, and substitutes that fall within the idea and technical scope of the present disclosure.

It will be understood that, although the terms "first", "second", etc. may be used herein to describe various elements, corresponding elements should not be understood as being limited by these terms, which are used only to distinguish one element from another. For example, within the scope defined by the present disclosure, a first element may be referred to as a second element, and similarly, a second element may be referred to as a first element.

Reference will now be made in detail to the preferred embodiments of the present disclosure, examples of which are illustrated in the accompanying drawings. Wherever possible, the same reference numbers will be used throughout the drawings to refer to the same or like parts.

In a fuel cell system, hydrogen supplied to a fuel electrode 110 of a fuel cell stack 100 is divided into hydrogen ions and electrons, the hydrogen ions move to an air electrode 120 through an electrolyte layer, and the electrons move to the air electrode 120 through an external circuit, whereby electricity, water, and heat are generated. Oxygen included in air supplied to the air electrode 120 of the fuel cell stack 100 comes into contact with the hydrogen ions, whereby water is generated as a reaction product. Reactions occurring at the fuel electrode 110 and the air electrode 120 and the overall reaction occur as represented by the following reaction formulas.

$$H_2 \rightarrow 2H^+ + 2e^- \quad \text{[Reaction formula at fuel electrode 110]}$$

$$\tfrac{1}{2}O_2 + 2H^+ + 2e^- \rightarrow H_2O \quad \text{[Reaction formula at air electrode 120]}$$

$$H_2 + \tfrac{1}{2}O_2 \rightarrow H_2O \quad \text{[Overall reaction formula]}$$

Meanwhile, the hydrogen ions must pass through the electrolyte layer, and permeability of hydrogen is set depending on water content. In order to improve permeability of hydrogen, therefore, a humidification module 300 configured to supply moisture to the hydrogen and the air supplied to the fuel cell stack 100 is provided.

The humidification module 300 serves to supply appropriate moisture to the hydrogen and the air supplied to the fuel cell stack 100 in order to maintain ion conductivity of the electrolyte layer. In particular, as output load increases, ion conductivity of the electrolyte layer is more greatly affected by the amount of humidification. Consequently, the amount of humidification is very important for water balance of the fuel cell system.

Referring to the overall reaction formula, water is generated. In addition, moisture is supplied to reactants. For this reason, in the case in which the fuel cell system is operated at a temperature at which water may be frozen, water molecules may be frozen. In particular, for a vehicle using hydrogen as fuel, there is a high possibility of the occurrence of a freezing phenomenon, since the fuel cell system is easily exposed to a sub-zero temperature. Even in a fuel cell for generation of electricity, a freezing phenomenon may occur in the case in which the system is operated in a sub-zero temperature environment. In the case in which water molecules are frozen, flow of gas and a product in the system is disturbed, whereby the fuel cell stack 100 may be damaged.

For a conventional fuel cell system, a freezing phenomenon is prevented using a method of further installing a separate heat source to sufficiently increase temperature of the fuel cell stack 100 and operating the fuel cell system in order to prevent damage thereto due to freezing.

In the conventional fuel cell system, a method of mounting a heat emission device, such as a heater, outside the fuel cell stack 100 to increase temperature of the fuel cell stack 100 and a method of increasing temperature of coolant using the heat emission device and allowing the coolant to flow into the fuel cell stack 100 are used.

The above methods require installation of a separate heat emission device, whereby installation cost increases, and electric power is further consumed in order to operate the heat emission device, whereby electric power production cost increases and thus electric power production efficiency is reduced.

The present disclosure provides a fuel cell system that supplies dry gas to operate the fuel cell stack 100 at the initial stage of operation and reduces output load to operate the system in a low output mode in order to prevent water from being frozen in the case in which ambient temperature is a temperate at which a freezing phenomenon may occur, whereby the system is stably operated without a separate heat emission device, and a control method thereof.

FIG. 1 is a view showing the construction of a fuel cell system according to an embodiment of the present disclosure. Referring to FIG. 1, the fuel cell system according to the embodiment of the present disclosure may include a fuel cell stack 100, a fuel gas supply module 200, a fuel gas supply line 400, a humidification module 300, and a controller 600.

The fuel cell stack 100 is a device that receives hydrogen and air to produce electricity and heat. The fuel cell stack 100 may include a plurality of cells configured to produce electricity. The fuel cell stack 100 includes a fuel electrode 110 and an air electrode 120, wherein reactions occurring at the fuel electrode 110 and the air electrode 120 occur as represented by the above reaction formulas.

The fuel gas supply module 200 is a device that supplies hydrogen and oxygen to the fuel cell stack 100. The fuel gas supply module 200 may include a hydrogen supply system 210 configured to supply hydrogen to the fuel cell stack 100 and an air supply system 220 configured to supply air including oxygen to the fuel cell stack 100. The hydrogen supply system 210 may include, for example, a storage for hydrogen, a compressor, a pump, gas channels, valves, etc., and the structure of the hydrogen supply system 210 may be a hydrogen supply system in a general fuel cell system that is commonly known in the art.

In this specification, hydrogen and oxygen, which are reactants configured to produce electricity and thermal energy in the fuel cell stack 100, are defined as fuel gases. For oxygen, air in the atmosphere, rather than pure oxygen, is supplied to the fuel cell stack 100, and oxygen included in the air is used as a reactant. Pure oxygen may improve efficiency of the fuel cell system, but cost and weight related to oxygen storage may increase. Consequently, air is supplied, since a large amount of oxygen is included in the air.

The fuel gas supply line 400 may include channels along which fuel gases discharged from the fuel gas supply module 200 are introduced into the fuel cell stack 100. The fuel gas supply line 400 may be connected to the fuel gas supply module 200 and to the fuel cell stack 100 such that the fuel gases are supplied to the fuel cell stack 100 therealong.

The humidification module 300 is a device disposed in the fuel gas supply line 400 to supply moisture to the fuel gases such that the fuel gases are humidified. A polymer membrane used as an electrolyte of the fuel cell stack 100 must always be hydrated in order to maintain conductivity of hydrogen ions. In the case in which the polymer membrane is dried during operation of the fuel cell stack 100, conductivity of hydrogen ions is deteriorated, and each electrode and the membrane are separated from each other due to contraction of the membrane, whereby contact resistance between each electrode and the membrane increases. The humidification module 300 serves to supply moisture to each fuel gas such that the humidified gas is supplied to the fuel cell stack 100.

The controller 600 is a device that controls the fuel gas supply module 200 to control the flow rate of each fuel gas and controls the fuel gas supply line 400 to control fuel gas channels. The controller 600 may control the flow rate of each fuel gas and the fuel gas channels depending on whether temperature of the fuel cell stack 100 is low.

The controller 600 of the fuel cell system according to an exemplary embodiment of the present disclosure may be a processor (e.g., computer, microprocessor, CPU, ASIC, circuitry, logic circuits, etc.). The controller 600 may be implemented by a non-transitory memory storing, e.g., a program(s), software instructions reproducing algorithms, etc., which, when executed, controls operations of various components of the fuel cell system, and a processor configured to execute the program(s), software instructions reproducing algorithms, etc. Herein, the memory and the processor may be implemented as separate semiconductor circuits. Alternatively, the memory and the processor may be implemented as a single integrated semiconductor circuit. The processor may embody one or more processor(s).

Upon determining that the temperature of the fuel cell stack 100 is low at the initial stage of operation of the fuel cell stack 100, the controller 600 may perform control such that the fuel gases bypass the humidification module 300 and are then directly supplied to the fuel cell stack 100. The low temperature means a temperature at which environmental temperature around the system is below zero or a temperature at which water may be frozen.

In the case in which the temperature of the fuel cell stack 100 is low, water generated in the fuel cell stack 100 or moisture contained in the fuel gases may be frozen. At the initial stage of operation of the fuel cell stack 100, temperature of the fuel cell stack 100 has not yet increased. When a rated operation or a high output operation is immediately performed, therefore, the fuel cell stack 100 may be damaged. Consequently, the channels are controlled such that the fuel gases are supplied in a state of not being humidified, i.e. dry gases are supplied.

Since the reaction occurring in the fuel cell stack 100 is exothermic, the temperature of the fuel cell stack 100 increases. When the temperature of the fuel cell stack 100 reaches a normal temperature, the controller 600 may control the fuel gas supply line 400 such that the fuel gases pass through the humidification module 300 and are then supplied to the fuel cell stack 100. That is, when the temperature of the fuel cell stack 100 reaches a normal temperature, the controller 600 controls the channels such that humidified gases are supplied.

In addition, the controller 600 may control the amount of each fuel gas that is supplied from the fuel gas supply module 200 to the fuel cell stack 100. Upon determining that the temperature of the fuel cell stack 100 is low, the controller 600 may perform control such that the amount of each fuel gas that is supplied is a rated operation amount or less and thus a small amount of each fuel gas is introduced into the fuel cell stack 100.

The fuel cell stack 100 is operated in a low output mode such that the temperature of the fuel cell stack 100 gradually increases, and when the temperature of the fuel cell stack 100 reaches a normal temperature, the controller 600 may perform control such that the amount of each fuel gas that is supplied is a rated operation amount. In the case in which a rated operation amount of each humidified fuel gas is supplied to perform a rated operation in the state in which the temperature of the fuel cell stack 100 is low, the fuel cell stack 100 may be damaged. For this reason, control is performed such that a small amount of each dry fuel gas is introduced to execute a low output mode before the temperature of the fuel cell stack 100 sufficiently increases.

At a low temperature, a small amount of each dry gas is supplied to operate the fuel cell stack 100 under control of the controller 600, and this operation is defined as operation in a low output mode. At a normal temperature, a rated operation amount of each humidified fuel gas is supplied to operate the fuel cell stack 100, and this operation is defined as operation in a normal output mode.

In the case in which the temperature of the fuel cell stack 100 is low, the controller 600 performs control such that the temperature of the fuel cell stack 100 increases without damage thereto in the low output mode and the fuel cell stack 100 is operated in the normal output mode, whereby it is possible to produce electricity and thermal energy without a separate heat emission device. Consequently, electricity production efficiency is improved, manufacturing cost is reduced, and the overall construction of the system is simplified.

In addition, upon determining that the temperature of the fuel cell stack 100 is low, the controller 600 may perform control such that the operation of the humidification module 300 is stopped. Since the fuel gases bypass the humidification module 300 and are then supplied to the fuel cell stack 100 in the low output mode, it is not necessary to operate the humidification module 300. Consequently, control is performed such that the humidification module 300 is not operated in the low output mode in order to efficiently operate the system. When the temperature of the fuel cell stack 100 increases to a normal temperature in the low output mode, the controller 600 may perform control to operate the humidification module 300. In the normal output mode, the fuel gases pass through the humidification module 300 and humidified gases are supplied to the fuel cell stack 100.

Referring to FIG. 1, the fuel cell system according to the embodiment of the present disclosure may further include a cooling module 700 having a reservoir tank 710, a coolant tank 720, and a heat exchanger 730.

The reservoir tank 710 is a device that circulates a first coolant configured to exchange heat with the fuel cell stack 100. The first coolant may be introduced into the fuel cell stack 100 from the reservoir tank 710, may exchange heat with the fuel cell stack 100, and may be introduced into the reservoir tank 710. In this way, the first coolant may circulate. Since the temperature of the fuel cell stack 100 increases during operation thereof, temperature of the first coolant gradually increases.

The coolant tank 720 is a device that circulates a second coolant configured to exchange heat with the first coolant. The heat exchanger 730 is arranged between the coolant tank 720 and the reservoir tank 710, and the first coolant and the second coolant may exchange heat with each other in the heat exchanger 730. That is, the first coolant in the reservoir tank 710 may exchange heat with the fuel cell stack 100 to directly cool the fuel cell stack 100, and the second coolant in the coolant tank 720 may exchange heat with the first coolant to indirectly cool the fuel cell stack 100.

In the case in which the fuel cell stack 100 is operated using dry gases in the low output mode, temperature of the first coolant does not increase to the extent to which cooling is necessary. In this case, the operation of the coolant tank 720 is not necessary and the temperature of the first coolant does not increase to a cooling temperature at which cooling is necessary or higher. As the temperature of the fuel cell stack 100 continuously increases, temperature of the first coolant that exchanges heat with the fuel cell stack 100 also gradually increases. In the case in which the temperature of the first coolant is a cooling temperature or lower, therefore, the controller 600 may perform control such that the coolant tank 720 is not operated, and upon determining that the temperature of the first coolant increases and thus is a cooling temperature or higher, the controller 600 may perform control such that the coolant tank 720 is operated. Consequently, it is possible to operate the system with optimum efficiency.

Also, in the fuel cell system according to the embodiment of the present disclosure, whether to operate the fuel cell stack 100 in the low output mode or the normal output mode may be determined based on voltage of the fuel cell stack 100. The controller 600 may compare voltage generated by the fuel cell stack 100 with a predetermined reference value, in the case in which the generated voltage is the reference value or higher, may determine that the temperature of the fuel cell stack 100 is a normal temperature, and may perform control such that the fuel cell stack 100 is operated in the normal output mode. For example, in the case in which the reference value is set to 0.4V and measured voltage is lower than 0.4V, the controller 600 may determine that the temperature of the fuel cell stack 100 is low and may perform control such that the fuel cell stack 100 is operated in the low output mode. In the case in which the measured voltage is 0.4V or higher, the controller 600 may determine that the temperature of the fuel cell stack 100 is a normal temperature and may perform control such that the fuel cell stack 100 is operated in the normal output mode. In this case, it is possible to determine timing at which humidified gases are to be supplied even though a separate temperature sensor is not provided.

The fuel cell system according to the embodiment of the present disclosure may further include a temperature sensor (not shown). The temperature sensor may perform a function of measuring temperature of the fuel cell stack 100. The controller 600 may determine whether the temperature of the fuel cell stack 100 is a low temperature or a normal temperature based on a value measured by the temperature sensor.

Referring to FIG. 1, the fuel gas supply line 400 may include a hydrogen supply line 410, an air supply line 420, a first bypass line 411, and a second bypass line 421.

The hydrogen supply line 410 is connected to the hydrogen supply system 210 and to the fuel electrode 110 of the fuel cell stack 100, and is configured to extend through the humidification module 300. Hydrogen discharged from the hydrogen supply system 210 passes through the humidification module 300 while flowing along the hydrogen supply line 410. At this time, moisture may be supplied to the hydrogen, and the humidified hydrogen may be introduced into the fuel electrode 110.

The air supply line 420 is connected to the air supply system 220 and to the air electrode 120 of the fuel cell stack 100, and is configured to extend through the humidification module 300. Air including oxygen discharged from the air supply system 220 passes through the humidification module 300 while flowing along the air supply line 420. At this time, moisture may be supplied to the air, and the humidified air may be introduced into the air electrode 120.

The first bypass line 411 may diverge from a point of the hydrogen supply line 410 before the humidification module 300, may bypass the humidification module 300, and may be connected to the fuel cell stack 100. In the case in which hydrogen flows in the first bypass line 411, the hydrogen may bypass the humidification module 300 and may be directly supplied to the fuel electrode 110.

The second bypass line 421 may diverge from a point of the air supply line 420 before the humidification module 300, may bypass the humidification module 300, and may be connected to the fuel cell stack 100. In the case in which air including oxygen flows in the second bypass line 421, the air may bypass the humidification module 300 and may be directly supplied to the air electrode 120.

The controller 600 may perform control such that the fuel gases flow in the first bypass line 411 and the second bypass line 421 in the low output mode and such that the fuel gases flow in the hydrogen supply line 410 and the air supply line 420 in the normal output mode.

In addition, the fuel cell system according to the embodiment of the present disclosure may further include a control valve 500 disposed in the fuel gas supply line 400 to control the fuel gas channels. The control valve 500 may change the fuel gas channels depending on the output mode under control of the controller 600.

The control valve 500 may include a first control valve 510 and a second control valve 520. The first control valve 510 may be located at a junction point between the hydrogen supply line 410 and the first bypass line 411 to control the hydrogen channel.

The second control valve 520 may be located at a junction point between the air supply line 420 and the second bypass line 421 to control the air channel. The controller 600 may control the first control valve 510 and the second control valve 520 such that hydrogen and oxygen selectively pass through the humidification module 300 and thus dry gases or humidified gases are introduced into the fuel cell stack 100. The dry gases are supplied in the low output mode, and the humidified gases are supplied in the normal output mode.

Since the fuel gas channels are controlled in the low output mode and the normal output mode by the control valve 500, the construction of which is simple, it is possible to easily control the supply of dry gases and humidified gases. Particularly, in the case in which the channels are controlled by the control valve 500, the controller 600 may also control operation of the humidification module 300. The controller 600 may perform control such that the humidification module 300 is not operated when the fuel gases bypass the humidification module 300, whereby it is possible to improve efficiency of the system.

Figure 2:
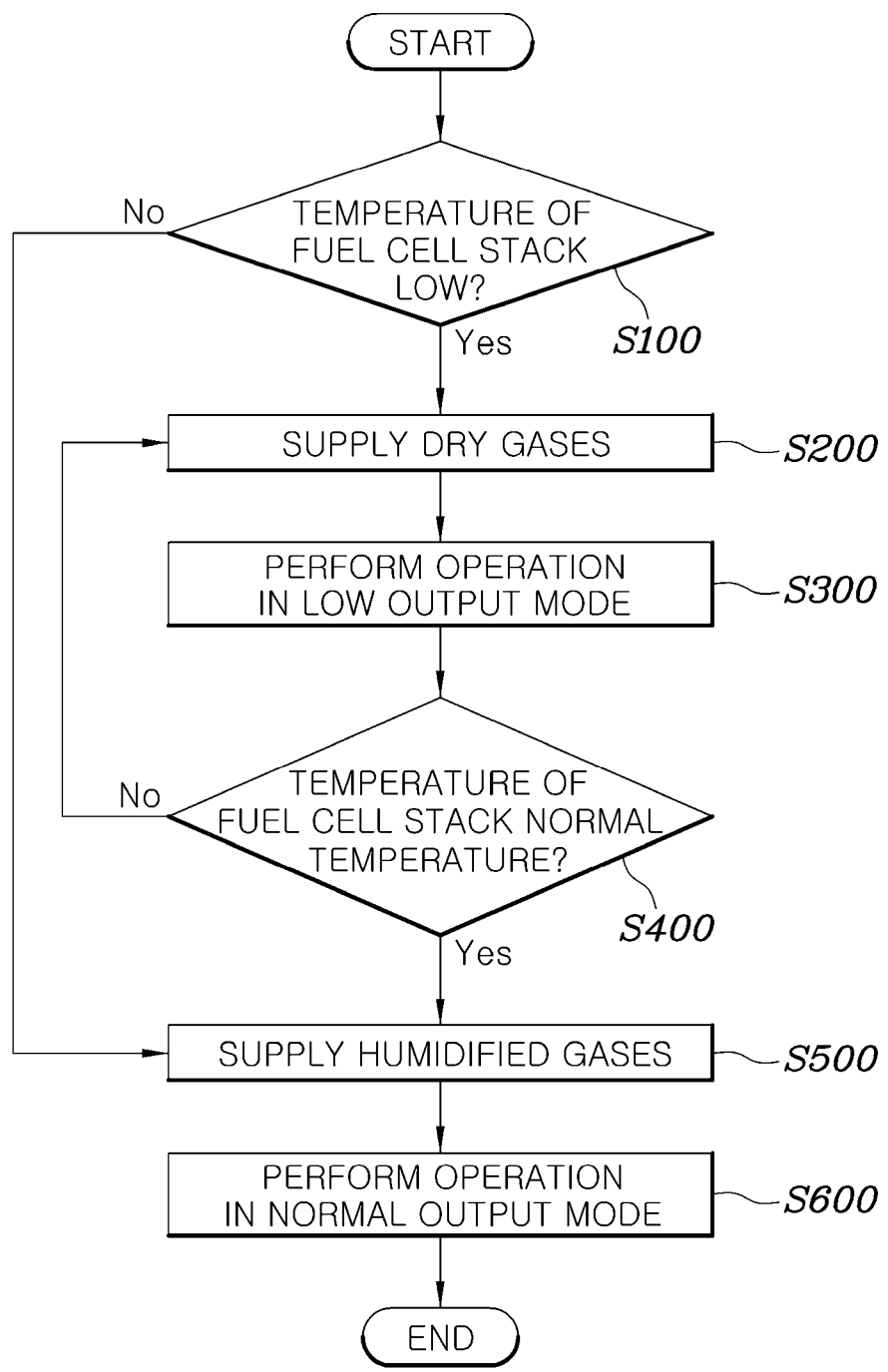
FIG. 2 is a flowchart showing a control method according to an embodiment of the present disclosure.

FIG. 2 is a flowchart showing a control method of a fuel cell system according to an embodiment of the present disclosure. The control method of the fuel cell system according to the embodiment of the present disclosure will be described with reference to FIG. 2.

When the fuel cell stack 100 is operated first, temperature of the fuel cell stack 100 is measured, and whether the temperature of the fuel cell stack 100 is low is determined based on the measured temperature (S100). For example, the temperature of the fuel cell stack 100 may be determined to be low when the measured temperature is lower than a preset temperature.

Upon determining that the temperature of the fuel cell stack 100 is a normal temperature, the humidification module 300 is operated to humidify fuel gases, the humidified gases are supplied to the fuel cell stack 100 (S500), and the fuel cell stack 100 is operated in the normal output mode (S600). For example, the temperature of the fuel cell stack 100 may be determined to be a normal temperature when the measured temperature is at the preset temperature or higher.

Upon determining that the temperature of the fuel cell stack 100 is low, fuel gases bypass the humidification module 300 and thus dry gases are supplied to the fuel cell stack 100 (S200), and the fuel cell stack 100 is operated in the low output mode (S300). The temperature of the fuel cell stack 100 is measured, and whether the temperature of the fuel cell stack 100 is a normal temperature is determined (S400). In the case in which the temperature of the fuel cell stack 100 is not the normal temperature, dry gases are continuously supplied to the fuel cell stack 100 (S200). When the temperature of the fuel cell stack 100 reaches the normal temperature, humidified gases are supplied to the fuel cell stack 100 (S500), and the fuel cell stack 100 is operated in the normal output mode (S600).

Further, in the case in which the fuel cell stack 100 is operated in the low output mode, the controller 600 may measure voltage of the fuel cell stack 100, may determine that the temperature of the fuel cell stack 100 is the normal temperature when the voltage is a reference value or higher, and may supply humidified gases such that the fuel cell stack 100 is operated in the normal output mode.

In the fuel cell system according to the present disclosure and the control method thereof, it is possible to operate the system without damage to the fuel cell stack 100 even in the case in which a separate heat emission device is not provided.

As is apparent from the above description, in the fuel cell system according to the present disclosure, the fuel cell stack is operated in the low output mode at a low temperature and is operated in the normal output mode after temperature of the fuel cell stack sufficiently increases, whereby it is possible to prevent damage to the fuel cell stack.

In addition, it is not necessary to install a separate heat emission device in order to prevent freezing, whereby installation cost of the system is reduced and the construction of the system is simplified. Furthermore, power consumption necessary to operate the heater is removed, whereby efficiency of the system is improved.

Although the preferred embodiments of the present disclosure have been described above with reference to the accompanying drawings, those skilled in the art will appreciate that the present disclosure can be implemented in various other embodiments without changing the technical ideas or features thereof.

What is claimed is:

1. A fuel cell system comprising:
   a fuel cell stack comprising a fuel electrode and an air electrode;
   a fuel gas supply module configured to supply hydrogen and oxygen, as fuel gases, to the fuel cell stack;
   a fuel gas supply line including channels through which the fuel gases are supplied to the fuel cell stack;
   a humidification module disposed in the fuel gas supply line, the humidification module being configured to supply moisture to the fuel gases in order to humidify the fuel gases; and
   a controller configured to control the fuel gas supply line such that:
   the fuel gases bypass the humidification module and are then directly supplied to the fuel cell stack upon determining that temperature of the fuel cell stack is lower than a first temperature at an initial stage of operation of the fuel cell stack, and
   the fuel gases pass through the humidification module and are then supplied to the fuel cell stack when the temperature of the fuel cell stack reaches a second temperature that is higher than or equal to the first temperature,
   wherein the controller is further configured to determine that the temperature of the fuel cell stack reaches the second temperature when voltage of the fuel cell stack is a reference value or higher.

2. The fuel cell system according to claim 1, wherein the controller is further configured to: control a discharge amount of each fuel gas discharged from the fuel gas supply module, to perform control such that the discharge amount of each fuel gas is a rated operation amount or less upon determining that the temperature of the fuel cell stack is lower than the first temperature, and to perform control such that the discharge amount of each fuel gas is the rated operation amount when the temperature of the fuel cell stack reaches the second temperature.

3. The fuel cell system according to claim 1, wherein the controller is further configured to perform control such that an operation of the humidification module is stopped upon determining that the temperature of the fuel cell stack is lower than the first temperature and such that the humidification module is operated when the temperature of the fuel cell stack reaches the second temperature.

4. The fuel cell system according to claim 1, further comprising a cooling module including a reservoir tank configured to circulate a first coolant to exchange heat with the fuel cell stack.

5. The fuel cell system according to claim 4, wherein the cooling module further includes a coolant tank configured to circulate a second coolant, and a heat exchanger arranged between the reservoir tank and the coolant tank to allow the first coolant and the second coolant to exchange heat with each other.

6. The fuel cell system according to claim 5, wherein the controller is further configured to perform control such that the coolant tank is operated upon determining that temperature of the first coolant is a cooling temperature or higher.

7. The fuel cell system according to claim 1, further comprising:
   a temperature sensor configured to measure the temperature of the fuel cell stack, wherein
   the controller is further configured to determine whether the temperature of the fuel cell stack is a temperature lower than the first temperature or a temperature higher than or equal to the second temperature based on a value measured by the temperature sensor.

8. The fuel cell system according to claim 1, wherein
   the fuel gas supply module comprises a hydrogen supply system configured to supply hydrogen to the fuel cell stack and an air supply system configured to supply air including oxygen to the fuel cell stack, and
   the fuel gas supply line comprises:
   a hydrogen supply line connected to the hydrogen supply system and to the fuel cell stack, the hydrogen supply line being configured to supply hydrogen, humidified while passing through the humidification module, to the fuel electrode;
   an air supply line connected to the air supply system and to the fuel cell stack, the air supply line being configured to supply air humidified, while passing through the humidification module, to the air electrode;
   a first bypass line diverging from a point of the hydrogen supply line before the humidification module, the first bypass line being configured to bypass the humidification module and to supply hydrogen directly to the fuel electrode; and
   a second bypass line diverging from a point of the air supply line before the humidification module, the second bypass line being configured to bypass the humidification module and to supply air directly to the air electrode.

9. The fuel cell system according to claim 8, further comprising:
   a control valve disposed in the fuel gas supply line, the control valve being configured to control the channels of the fuel gas supply line, wherein
   the controller is further configured to control the control valve in order to control the channels.

10. The fuel cell system according to claim 9, wherein:
    the control valve comprises a first control valve located at a junction point between the hydrogen supply line and the first bypass line and a second control valve located at a junction point between the air supply line and the second bypass line, and
    the controller controls the first control valve and the second control valve such that hydrogen and oxygen selectively pass through the humidification module.

11. The fuel cell system according to claim 1, wherein, upon determining that the temperature of the fuel cell stack is lower than the first temperature, the controller performs control such that an amount of each fuel gas supplied to the fuel cell stack is less than an amount of each fuel gas when the temperature of the fuel cell stack is determined to reach the second temperature.

12. A control method of the fuel cell system according to claim 1, the control method comprising:
    measuring temperature of the fuel cell stack and determining whether the temperature of the fuel cell stack is low;

supplying humidified gases to the fuel cell stack such that the fuel cell stack is operated in a normal output mode upon determining that the temperature of the fuel cell stack is a normal temperature at an initial stage of operation of the fuel cell stack, and supplying dry gases such that the fuel cell stack is operated in a low output mode upon determining that the temperature of the fuel cell stack is low; and measuring the temperature of the fuel cell stack when the fuel cell stack is operated in the low output mode, and supplying the humidified gases to the fuel cell stack upon determining that the temperature of the fuel cell stack reaches the normal temperature such that the fuel cell stack is operated in the normal output mode.

13. The control method according to claim 12, wherein, when the fuel cell stack is operated in the low output mode, the controller determines that the temperature of the fuel cell stack is the normal temperature and performs control such that the fuel cell stack is operated in the normal output mode in a case in which voltage of the fuel cell stack is a reference value or higher.

14. The control method according to claim 12, wherein, when the fuel cell stack is operated in the low output mode, the controller performs control such that an amount of each fuel gas supplied to the fuel cell stack is less than an amount of each fuel gas that is supplied when the fuel cell stack is operated in the normal output mode.

* * * * *